United States Patent

Hilby

[11] 3,889,903
[45] June 17, 1975

[54] AIRFOIL LEADING EDGE STRUCTURE WITH BOUNDARY LAYER CONTROL

[75] Inventor: Noel Evan Hilby, Maple Valley, Wash.

[73] Assignee: The Boeing Company, Seattle, Wash.

[22] Filed: Mar. 4, 1974

[21] Appl. No.: 448,080

Related U.S. Application Data

[63] Continuation of Ser. No. 339,735, March 9, 1973, abandoned.

[52] U.S. Cl............ 244/42 CC; 244/124; 416/90 A
[51] Int. Cl............................................ B64c 21/04
[58] Field of Search......... 244/42 C, 42 CC, 42 CD, 244/42 CE, 42 CF, 40 R, 123, 124; 416/90 R, 90 A; 415/DIG. 1

[56] References Cited
UNITED STATES PATENTS
2,514,105  7/1950  Thomas ......................... 244/123 X
3,009,668  11/1961  Nystrom......................... 244/42 CC Primary Examiner—Trygve M. Blix
Assistant Examiner—Barry L. Kelmachter
Attorney, Agent, or Firm—Christensen, O'Connor, Garrison & Havelka

[57] ABSTRACT

The airfoil has jaws on the front face of the front spar therein, and the jaws have a boundary layer control duct supported therein which is slotted along the forward side thereof. The slot has coextensive, relatively upper and lower lips projecting outboard from the upper and lower edges thereof, the upper of which lips extends reentrantly upwardly and distantly away from the upper edge of the slot, and forms the overside of the leading edge of the airfoil. The lower lip forms a throat with the upper lip, outboard from the slot, and in addition, has a deflector thereon which forms a convergent nozzle or nozzles with the upper lip, through which the throat discharges upwardly over the outer surface of the upper lip. The lower lip also serves as a hold-down surface for a section of skin which forms the underside of the leading edge of the airfoil.

10 Claims, 12 Drawing Figures

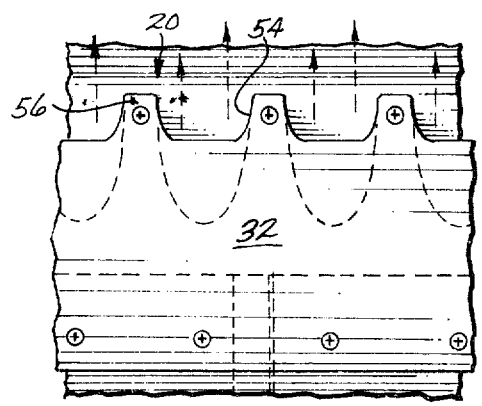
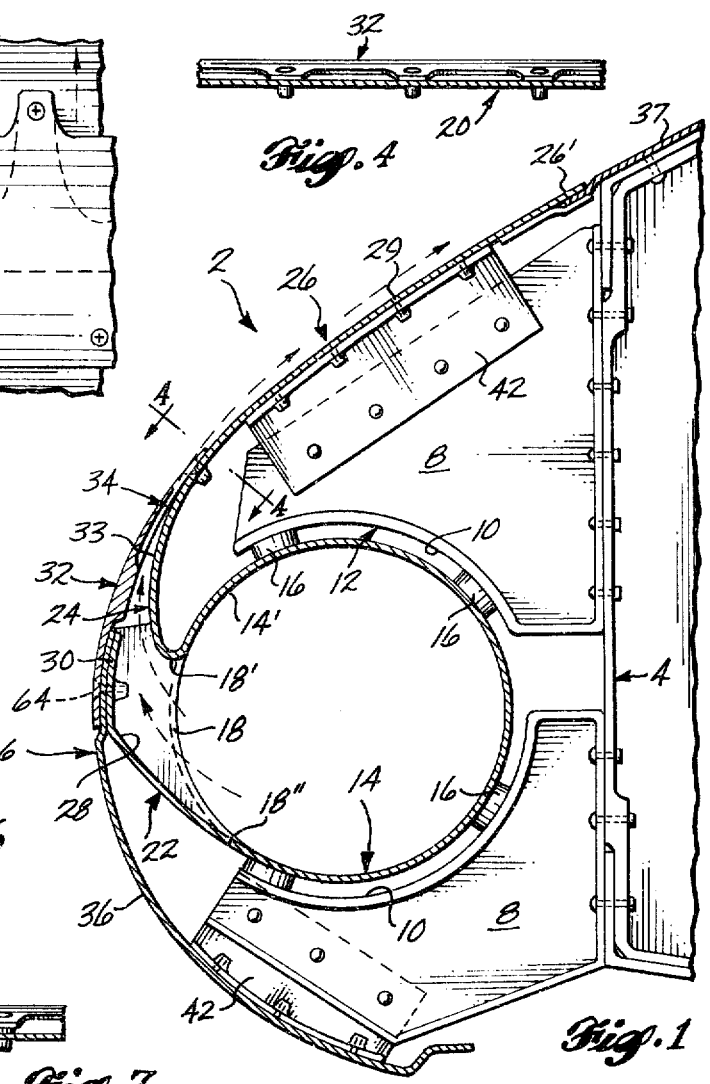
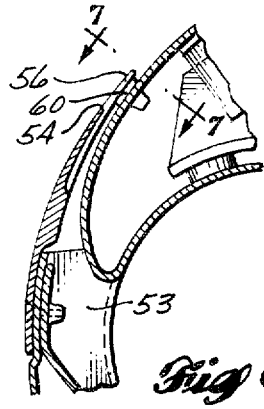
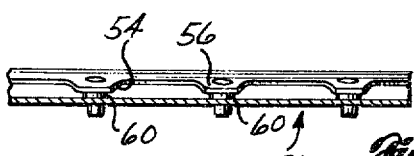
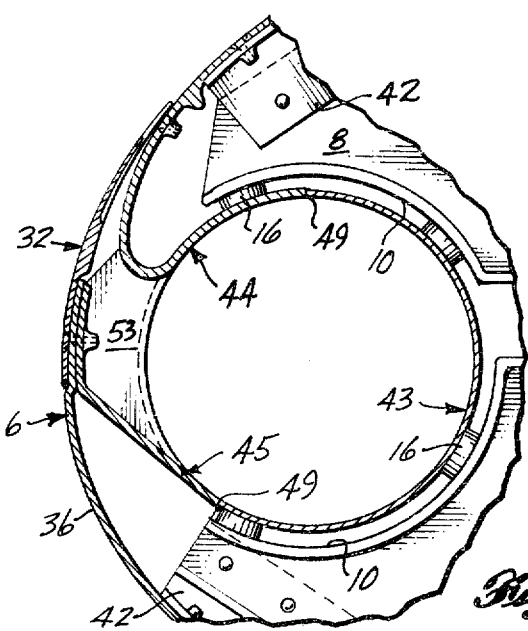
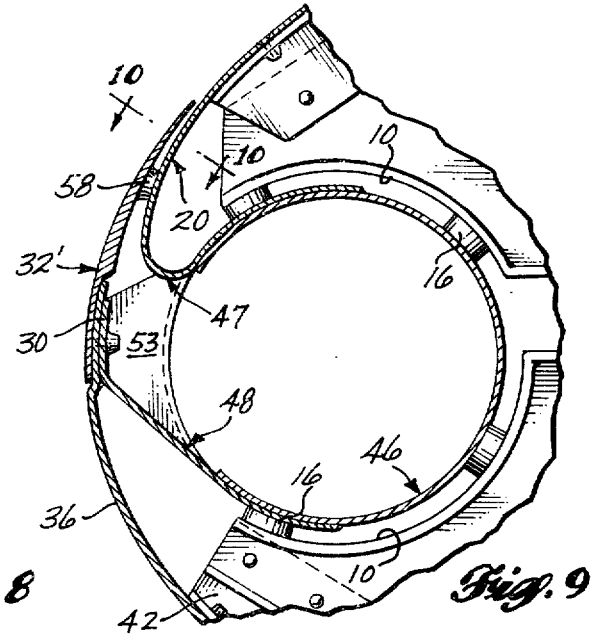

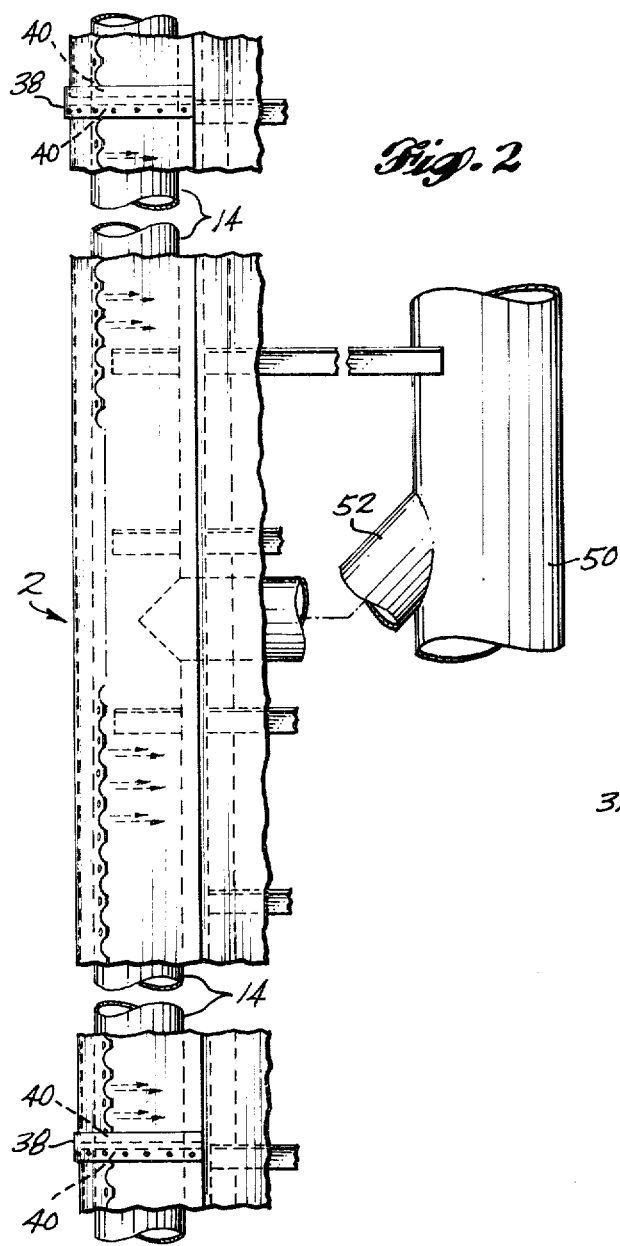
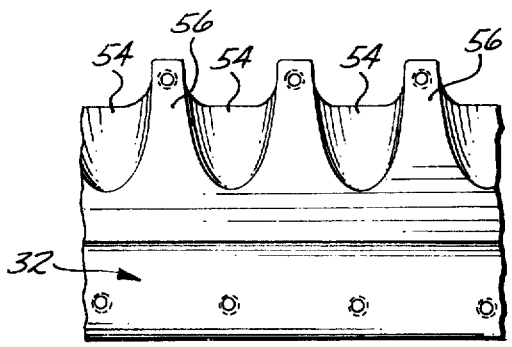
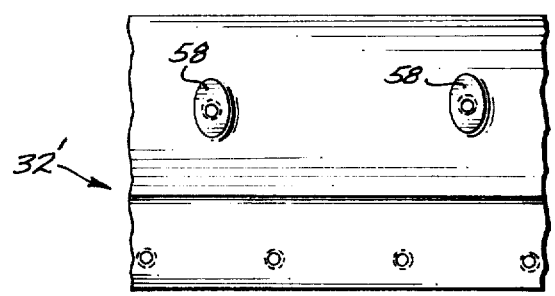
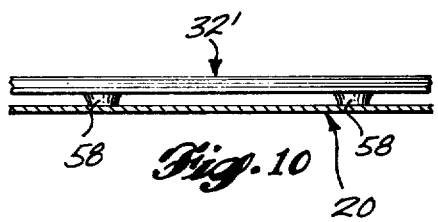
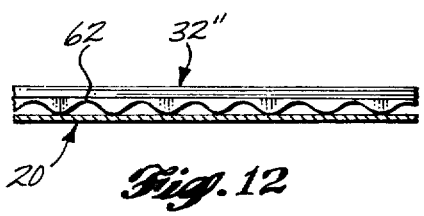

AIRFOIL LEADING EDGE STRUCTURE WITH BOUNDARY LAYER CONTROL

This is a continuation of application Ser. No. 339,735, filed Mar. 9, 1973 now abandoned.

THE INVENTION IN GENERAL

This invention relates to the leading edge structure of an airfoil of an aircraft, and in particular, to a structure of this nature which is equipped with boundary layer control means. The boundary layer control means include a pressurized air duct which is supported in jaws on the front face of the front spar of the airfoil, and equipped with a longitudinally extending slot along the forward side thereof. The pressurized air is discharged through the slot into a throat defined between a pair of lips extending outboard from the upper and lower edges of the slot. The upper lip extends reentrantly upwardly and distantly away from the upper edge of the slot to form the overside of the leading edge of the airfoil; whereas the lower lip forms a throat with the upper lip, outboard of the slot, and in addition, has a deflector thereon which forms a convergent nozzle or nozzles with the upper lip, through which the throat discharges the air upwardly over the outer surface of the upper lip. The lower lip also serves as a hold-down surface for a section of skin which forms the underside of the leading edge of the airfoil.

BRIEF DESCRIPTION OF THE DRAWINGS

These and other features of the invention will be understood by reference to the accompanying drawings which illustrate certain presently preferred embodiments of the invention.

In the drawings, FIG. 1 is a part cross-sectional view of the leading edge structure of an airfoil;

FIG. 2 is a part plan view of the structure;

FIG. 3 is a part elevational view of the leading edge itself;

FIG. 4 is a head-on view of a set of nozzles formed in the edge;

FIG. 5 is an inboard view of an element of the nozzles;

FIG. 6 is a part cross-sectional view of the leading edge;

FIG. 7 is another head-on view of the nozzles in FIG. 4, as they have been modified by the addition of shims thereto;

FIG. 8 is a part cross-sectional view of the structure in FIG. 1, showing a means and technique for fabricating a duct in the structure;

FIG. 9 is another such view showing a different means and technique for fabricating the duct;

FIG. 10 is a head-on view of a modified nozzle construction;

FIG. 11 is an inboard view of an element in the construction; and

FIG. 12 is a head-on view of another nozzle construction.

DESCRIPTION OF THE ILLUSTRATED EMBODIMENT

Referring to the drawings, it will be seen that the leading edge portion 2 of the airfoil has a spar 4 extending spanwise thereof adjacent the edge 6. The spar has pairs of jawlike brackets 8 secured to the front face thereof, at spaced intervals along the length thereof. Each pair of brackets 8 is mounted in spaced, superposed relationship on the spar, and has opposing part cylindrical recesses 10 therein, which form a jaw 12 between the brackets, which is adapted in turn to have an elongated pressurized air duct 14 accommodated therein. The duct is made up in 80-inchlong sections 14' which are supported in mutually aligned but spaced relationship to one another longitudinally of the duct, as well as in spaced relationship to the recesses 10 of the jaws, so as to allow for thermal expansion on the part of each, both radially and longitudinally of the duct. Sets of spacers 16 serve to center the sections in the jaws, and preferably the spacers are fabricated from a material such as Teflon, which allows for relative sliding of the duct sections, on the ends of the spacers.

Each section of the duct is generally cylindrical in cross-section, but has a longitudinally extending slot 18 along the forward side thereof, which in turn has coextensive, relatively upper and lower lips 20 and 22 projecting outboard from the upper and lower edges 18' and 18" thereof. The upper lip 20 curves reentrantly upwardly and distantly away from the upper edge 18' of the slot, so as to form first, a generally U-shaped brow 24 in front of the edge, and thence, a swept back forehead 26, the distal end edge 26' of which terminates well above the duct, along a line spaced rearwardly thereof. The lower lip 22 extends outboard from the lower edge 18" of the slot in a flatter projection, and in spaced relationship to the brow 24 of the upper lip, so as to define a throat 28 therebetween, outboard of the slot. In addition, the lower lip 18" has an upstanding portion 30 on the outboard end edge thereof, which fairs into the upper curve 29 of the forehead 26 of the upper lip, but terminates short of the upper lip so that the throat 28 opens thereopposite. The upstanding portion 30 serves as a shoe on which to secure an elongated deflector 32, which is attached horizontally or lengthwise of the same, so as to project upwardly therefrom in faired relationship with the upper curve of the forehead, but in spaced, collateral relationship with the lower curve 33 of the forehead, so as to form a convergent nozzle or nozzles 34 between the deflector and the upper lip, through which the throat 28 discharges outboard over the surface of the forehead, as indicated by the arrows in FIG. 1. The upstanding portion or shoe 30 of the lower lip also operates as a hold-down surface for a section of skin 36 which is clamped between the deflector and the shoe, and swept back under the lower brackets 8 of the duct, to form the underside of the leading edge 6 at each duct section.

Like the duct sections 14', the skin sections 36 and the deflectors 32 are all aligned, but spaced apart spanwise of the edge 6. The overside of the edge is formed by the foreheads 26 of the upper lips, which extend to the top of the spar where the distal end edges of the same are mated with the upper surface skin 37 of the airfoil. The open joints between the ends 40 of the respective duct sections, are covered by strips 38 of curved skin, which are secured however, to the duct and skin sections on only one side of each joint, so as to allow for expansion between the sections as indicated. The strips are secured through the duct and skin sections to pairs of L-shaped clips 42 that are fastened to the upper and lower brackets to buttress the assembly as illustrated. Preferably, the strips and sections are secured to the clips, or the clips are secured to the brackets, by slotted fastener means, or the like, which enable the strips and sections to undergo a slight degree of shift relative to the clips, or to the brackets. Also, the spacers 16 are constructed of a resiliently yieldable material which enables the duct sections to expand inboard of the jaws, so that the entire leading edge assembly has room for considerable play among the various components therein.

As seen in FIGS. 8 and 9, this effect can be maintained notwithstanding that each of the duct sections is fabricated from a plurality of subsections. In FIG. 8, a part-cylindrical body portion 43 is used, together with upper and lower lip portions 44 and 45 that are edge-abutted with and welded to the body portion at 49. In FIG. 9, the part-cylindrical body portion 46 is overlapped to a considerable extent with the proximal edges of the upper and lower lip portions 47 and 48, to form a stronger but more exaggerated assembly.

The duct is fed through a manifold 50 that has a feeder connection 52 with each of the duct sections. For rigidity, vertical spacers 53 are interposed in the throat 28 of each duct section, at intervals of perhaps several inches apart, and if desired these spacers may be curved to act as deflectors for the air, so that the air will be assured of reaching the nozzles 34 throughout the entire length of the duct.

The nozzles may be formed by thumbprint-like indentations 54 which are disposed in the distal edges of the inboard faces of the deflectors 32, so as to form lands 56 therebetween; or by shimlike lands 58 on the inboard faces of plain-edged deflectors 32', as in FIGS. 9 through 11; or by a combination of indentations 54 and shims 60, as in FIGS. 6 and 7; or by using deflectors 32" having fluted or corrugated edges 62, as in FIG. 12. Moreover, for purposes of modifying the aircraft, the nozzles can be altered, either by shimming the same as indicated, or by removing and reworking the edges of the deflectors, in which case the deflectors are removably fastened to the shoes, as seen at 64.

I claim:

1. In the leading edge structure of an airfoil, a spar spanwise thereof, front opening jaws on the spar, a boundary layer control duct supported in the jaws, and having a longitudinally extending slot along the forward side thereof, which slot has coextensive, relatively upper and lower lips projecting outboard from the upper and lower edges thereof, the upper of which lips extends reentrantly upwardly and distantly away from the upper edge of the slot, and forms the overside of the leading edge of the airfoil, and the lower of which lips forms a throat with the upper lip, outboard of the slot, and has a deflector thereon which forms a convergent nozzle with the upper lip, through which the throat discharges upwardly over the outer surface of the upper lip, said duct being part cylindrical in cross section, and mounted in jaws of complementary cross section, with symmetrically radially oriented spacers interposed therebetween.

2. The leading edge structure according to claim 1 wherein the distal end edge of the upper lip coterminates with the upper surface skin of the airfoil, adjacent the top of the spar.

3. The leading edge structure according to claim 1 further comprising a section of skin depending from the lower lip and swept back below the duct to form the underside of the leading edge of the airfoil.

4. The leading edge structure according to claim 1 wherein the deflector is removably attached to the lower lip.

5. In an airfoil, a main frame having a spar which extends spanwise of the airfoil, and which has bracket means thereon that project relatively forwardly from the spar and define front opening jaws on the frame, a skin covering the frame at the periphery of the airfoil, and terminating at the rear of the jaws adjacent the spar, and a leading edge structure on the frame including a boundary layer control duct which is supported in the jaws and has a longitudinally extending slot in the relatively forward side thereof, said duct having upper and lower lips projecting from the upper and lower edges of the slot, the upper of which lips extends upwardly above the bracket means and rearwardly of the slot, and forms the overside of the leading edge of the airfoil, and the lower of which lips forms a throat with the upper lip, and has means thereon forming a nozzle whereby the throat discharges upwardly over the outer surface of the upper lip, said upper lip mating with the skin adjacent the top of the spar, to form a smooth continuous contour over the upper surface of the airfoil, said duct being supported in spaced relationship to the jaws and said leading edge structure being secured to the bracket means so that said structure is shiftable in relation to the frame as the structure undergoes expansion and contraction in use.

6. The airfoil according to claim 5 wherein the leading edge structure also includes a section of skin which depends from the lower lip of the duct and is swept back below the bracket means to form the underside of the leading edge of the airfoil.

7. The airfoil according to claim 6 wherein the swept-back skin section terminates in spaced relationship to the frame adjacent the bottom of the spar.

8. The airfoil according to claim 5 wherein the duct and jaws have complementary cross sections and are spaced apart by symmetrically disposed spacers interposed therebetween.

9. The airfoil according to claim 5 wherein the upper lip of the duct projects relatively forwardly from the upper edge of the slot, and thence extends reentrantly upwardly above the bracket means in spaced relationship to the main body of the duct.

10. In an airfoil, a main frame having a spar which extends spanwise of the airfoil, and which has bracket means thereon that project relatively forwardly from the spar, a skin covering the frame at the periphery of the airfoil, and terminating at the rear of the bracket means adjacent the spar, and a leading edge structure on the frame including a boundary layer control duct which is supported in the bracket means and has a longitudinally extending slot in the relatively forward side thereof, said duct having upper and lower lips projecting from the upper and lower edges of the slot, the upper of which lips extends upwardly above the bracket means and rearwardly of the slot, and forms the overside of the leading edge of the airfoil, and the lower of which lips forms a throat with the upper lip, and has means thereon forming a nozzle whereby the throat discharges upwardly over the outer surface of the upper lip, said upper lip mating with the skin adjacent the spar, to form a smooth continuous contour over the upper surface of the airfoil, said duct being supported in spaced relationship to the bracket means and being secured to the bracket means so that said duct is shiftable in relation to the frame as the duct undergoes expansion and contraction in use.

* * * * *